United States Patent [19]

Clark

[11] 3,928,845

[45] Dec. 23, 1975

[54] CHARACTER GENERATOR SYSTEM SELECTIVELY PROVIDING DIFFERENT DOT-MATRIX SIZE SYMBOLS

[75] Inventor: Robert John Clark, Dorion, Canada

[73] Assignee: RCA Corporation, New York, N.Y.

[22] Filed: Dec. 11, 1974

[21] Appl. No.: 531,613

[52] U.S. Cl. ........................ 340/324 AD; 340/172.5
[51] Int. Cl.$^2$ ............................................. G06F 3/14
[58] Field of Search .................... 340/324 AD, 172.5

[56] References Cited

UNITED STATES PATENTS

| | | | |
|---|---|---|---|
| 3,514,616 | 5/1970 | Kolb | 340/324 AD |
| 3,659,283 | 4/1972 | Ophir | 340/324 AD |
| 3,735,383 | 5/1973 | Naka | 340/324 AD |
| 3,750,135 | 7/1973 | Carey et al. | 340/324 AD |

*Primary Examiner*—Marshall M. Curtis
*Attorney, Agent, or Firm*—Edward J. Norton; George J. Seligsohn

[57] ABSTRACT

The versatility of a character generator system, suitable for use in a television broadcast controller, is enhanced by employing a read/write character generator memory of a given overall storage capacity, rather than a ROM, and organizing the memory to store symbols in any selected single one of a given number of different predetermined dot-matrix sizes. Logic means responsive to the selected dot-matrix size are provided for digitally generating symbols for display on a display device exhibiting a television raster scan employing the particular alphabet of symbols then stored in the memory in the selected dot-matrix size.

7 Claims, 7 Drawing Figures

HIGH RESOLUTION VARIABLE MATRIX CHARACTER GENERATOR SYSTEM

HIGH RESOLUTION VARIABLE MATRIX CHARACTER GENERATOR SYSTEM

SELECT LOGIC FOR HIGH RESOLUTION 32 x 32 MATRIX OPERATION

LOW RESOLUTION VARIABLE MATRIX CHARACTER GENERATOR SYSTEM

SELECT LOGIC FOR LOW RESOLUTION VARIABLE MATRIX CHARACTER GENERATION SYSTEM

CHARACTER GENERATOR SYSTEM SELECTIVELY PROVIDING DIFFERENT DOT-MATRIX SIZE SYMBOLS

This invention relates to the digital generation of video signals manifesting characters or other graphic symbols and, more particularly, to a programmable and variable matrix character generator, suitable for use in television broadcasting for generating symbols in many languages including Arabic and Hebrew symbols.

In the past, the character generator employed both in television broadcasting and in conventional video terminals, for the digital generation of video signals manifesting graphic symbols for display on a conventional television set or monitor comprised a read only memory (ROM). Such a ROM permanently stores the dot pattern for each symbol of a predetermined alphabet of different symbols. For instance, ROM integrated circuit chips are available which store an alphabet of 64 symbols, each symbol being composed of a 5×7 dot matrix. Other somewhat higher resolution commonly used ROM dot pattern matrices include 7×9 dots and 7×11 dots. To meet the high resolution requirement of broadcast television, a high resolution ROM character generator employing a 32×32 dot pattern matrix for each symbol is often employed.

In the standard approach for generating video signals manifesting the symbols stored in a ROM, the ROM is simultaneously addressed by a first multibit symbol code (such as the ASCII code) and a second multibit TV scan line code. The symbol code defines the particular one of the alphabet of symbols to be read out, while the TV scan-line code defines the particular one of a given number of consecutive raster scan lines occupied by a row of symbols then being scanned. In response thereto, the ROM loads the various stages of a shift register with the dot pattern corresponding to the particular symbol and television scan line then being read out. This loading of the shift register takes place at the beginning of each symbol display interval. During the symbol display interval, the dot pattern is shifted out serially by a dot clock to produce the digital video. Therefore, the shift register serves as a parallel-to-serial converter. The video signal output from the shift register, after being combined with suitable sync and blanking signals, is employed either directly (in a video terminal) or indirectly (in television broadcasting) as an intensity-modulating signal of the cathode ray of a television kinescope.

By its very nature, the alphabet of symbols stored in a read only memory (ROM) character generator is permanent. Therefore, it is not possible, employing a ROM, to change the symbol alphabet stored therein. Further, by its very nature, the organization of the respective bits of a ROM having a predetermined overall storage capacity is fixed. That is, the overall storage capacity is divided into a predetermined fixed number of dot matrices (such as 64) with each individual one of these matrices having the same given fixed size and organization (such as 5×7).

The present invention describes a unique type of character generator which uses a read/write memory, instead of a read only memory (ROM) and, further, incorporates a programmable memory organization logic. This permits a memory of a predetermined overall storage capacity to be used at different times to store altogether different alphabets of symbols in a given number of different selectable matrix sizes to suit different particular language requirements.

This and other features and advantages of the present invention will become more apparent from the following detailed description taken together with the accompanying drawing in which.

Figure 1:
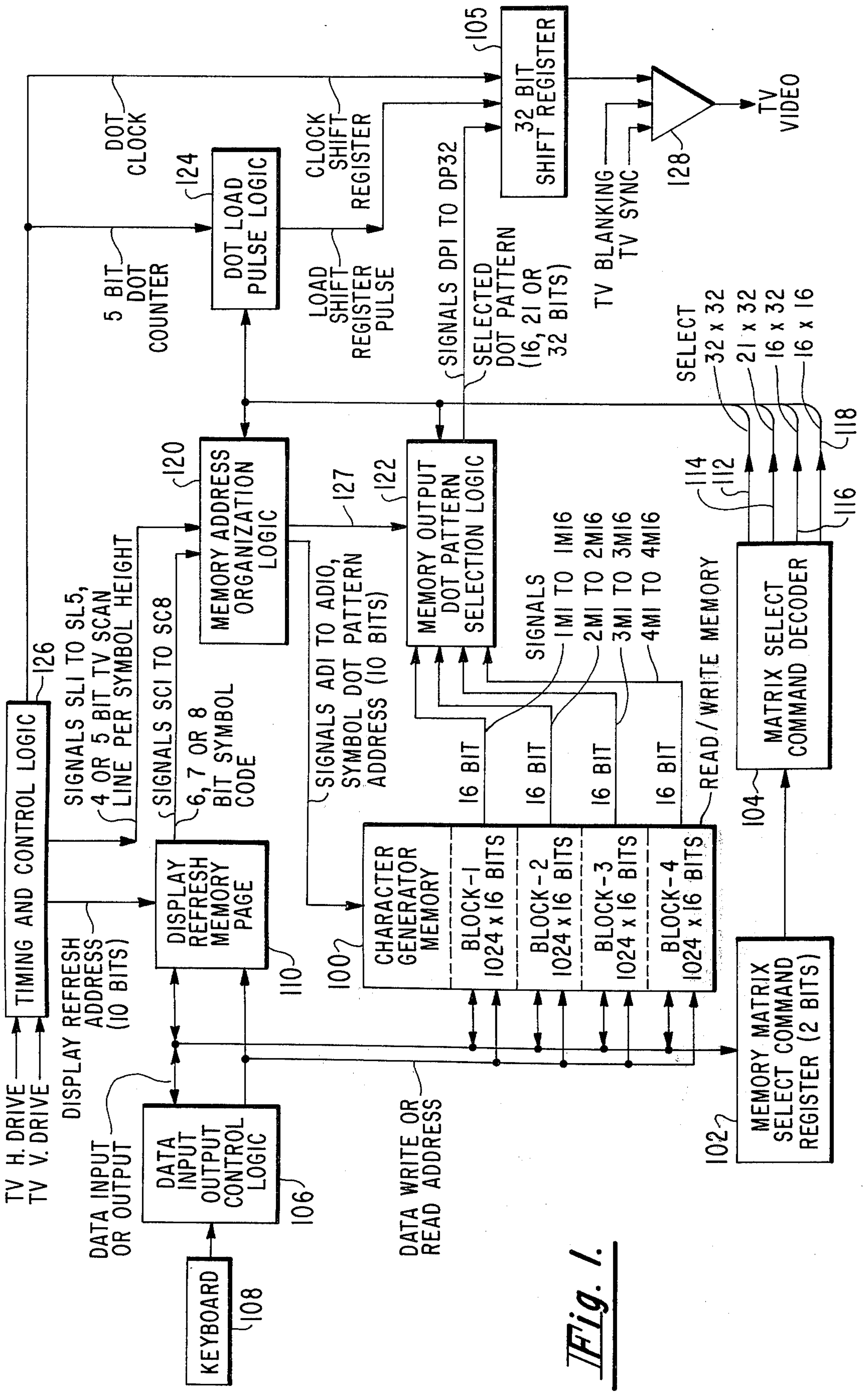
FIG. 1 is a block diagram of a high resolution variable matrix character generator system.

Referring now to FIG. 1, the conventional character generator ROM is replaced in FIG. 1 with read/write character generator memory 100. As shown, character generator memory 100, which has an overall storage capacity of 65,536 bits, is composed of four blocks, each consisting of 1,024 separate words, each word consisting of 16 bits. As described in detail below, on command the memory organization logic of the high resolution variable matrix character generator system of FIG. 1 further divides character generator memory 100 into any one of a selected specific number of symbol dot matrix locations, where each matrix location is capable of storing bits for various matrix sizes. These matrix sizes include 1) 64 symbol matrix locations of 32×32 dot matrix bits per location; 2) 96 symbol matrix locations of 21×32 dot matrix bits per location; 3) 128 symbol matrix locations of 16×32 dot matrix bits per location, and 4) 256 symbol matrix locations of 16×16 bits per location.

Briefly, character generator 100 operates in the desired symbol/matrix mode by writing the required symbol font dot pattern words into the character generator memory and writing the desired matrix select command word (which consists of two bits) into memory matrix select command register 102. The two-bit matrix select command register output is decoded into four matrix select signals by matrix select command decoder 104 which controls the memory output organization logic as indicated in FIGS. 2, 3, 4 and 5. In response to the command signals, the memory output organization logic controls the reading of the character generator memory to shift register 105 in appropriate sequences of dot patterns which correspond to the selected matrix.

More specifically, as shown in FIG. 1, data input/output control logic 106, which may obtain data input information from a data input device, such as keyboard 108, is capable of 1) loading the blocks of character memory 100 with a preselected alphabet of characters respectively located at preselected addresses therein; 2) applying a two-bit code to memory matrix select command register 102, which selects the appropriate one of four predetermined matrix sizes, and 3) writing into display refresh memory page 110 the characters forming the message to be displayed, with each respective character of the message being located at an address of display refresh memory page 110 which bears a one-two-one correspondence with the position of the character space occupied by that character in the display. Data input/output control logic 106 is also capable of controlling character generator memory 100, memory matrix select command register 102 and display refresh memory page 110 to regenerate a data output manifesting the information stored therein.

Details of the particular manner in which character generator memory 100, memory matrix select command register 102 and/or display refresh memory page 110 is loaded or unloaded with data by data input/output control logic 106, in itself, forms no part of the present invention and is performed by conventional techniques normally employed in the data processing art for loading and unloading memories. Instead, the present invention is concerned with the manner in which an appropriate television video signal is generated in accordance with the data which has been written into and stored in character generator memory 100, memory matrix select command register 102 and display refresh memory page 110, rather than the details of the loading and unloading of these memories.

More specifically, in accordance with the binary value of the two bits stored in memory matrix select command register 102, matrix select command decoder 104 applies a select signal to one, and only one, of its respective output conductors 112, 114, 116 and 118. Respective output conductors 112, 114, 116 and 118 individually correspond with the selection of the 32×32 matrix, the 21×32 matrix, the 16×32 matrix and the 16×16 matrix. As shown, conductors 112, 114, 116 and 118 are coupled as inputs to memory address organization logic 120, memory output dot selection logic 122 and dot load pulse logic 124, to indicate to the logic in blocks 120, 122 and 124 the particular one of the four matrices which is then selected.

Timing and control logic 126, which is synchronized by television horizontal and vertical drive sync signals applied as inputs thereto, provides display refresh memory page 110 with a 10-bit display refresh address. In addition, timing and control logic 126 applies signals SL1 to SL5, which manifest a four or five bit television scan line per symbol height input to memory address organization logic 120. Further, timing and control logic 126 applies a dot clock input to 32 bit shift register 105 and also applies a group of five dot counter signals to dot load pulse logic 124. In response to being addressed, display refresh memory page 110 applies signals SC1 to SC8, manifesting 6, 7 or 8 bit symbol codes, as in input to memory address organization logic 120.

In response to the respective values of the three inputs to memory address organization logic 120, logic 120 simultaneously applies signals AD1 to AD10, manifesting a 10-bit symbol dot pattern address as an input to all four blocks of character generator memory 100. This input to character generator memory 100 specifies a particular 16 bit word in each respective one of the four blocks of character generator memory 100. Therefore, in response to signals AD1 to AD10 character generator memory supplies a first 16 bit input, 1M1 to 1M16, from block 1 to memory output dot pattern selection logic 122. In a similar manner, signals 2M1 to 2M16, 3M1 to 3M16 and 4M1 to 4M16 from blocks 2, 3 and 4, respectively, are applied as inputs to memory output dot pattern selection logic 122. Memory output dot pattern selection logic 122 also has control inputs forwarded thereto from memory address organization logic 120 over connection 127.

Memory output dot pattern selection logic 122, in accordance with all of the inputs applied thereto, loads shift register 105 with signals DP1 to DP32, which manifest a selected dot pattern of 16 21 or 32 bits in accordance with the selected matrix. This loading occurs in response to a load shift register input applied to shift register 105 from dot load pulse logic 124. The dot clock applied to shift register 105 causes the loaded bits to be read out serially (so that shift register 105 operates as a parallel-to-serial converter) and then applied as an input to signal mixer 128. Signal mixer 128 adds a TV blanking signal and TV sync signals to the input thereto from shift register 105 to provide a composite television video signal output therefrom.

In order to understand the operation of the generator system shown in FIG. 1, it is necessary to consider the internal arrangement and manner of response of each of memory address organization logic 120, memory output dot pattern selection logic 122 and dot load pulse logic 124 to each respective one of the four predetermined matrix select signals.

Figure 2:
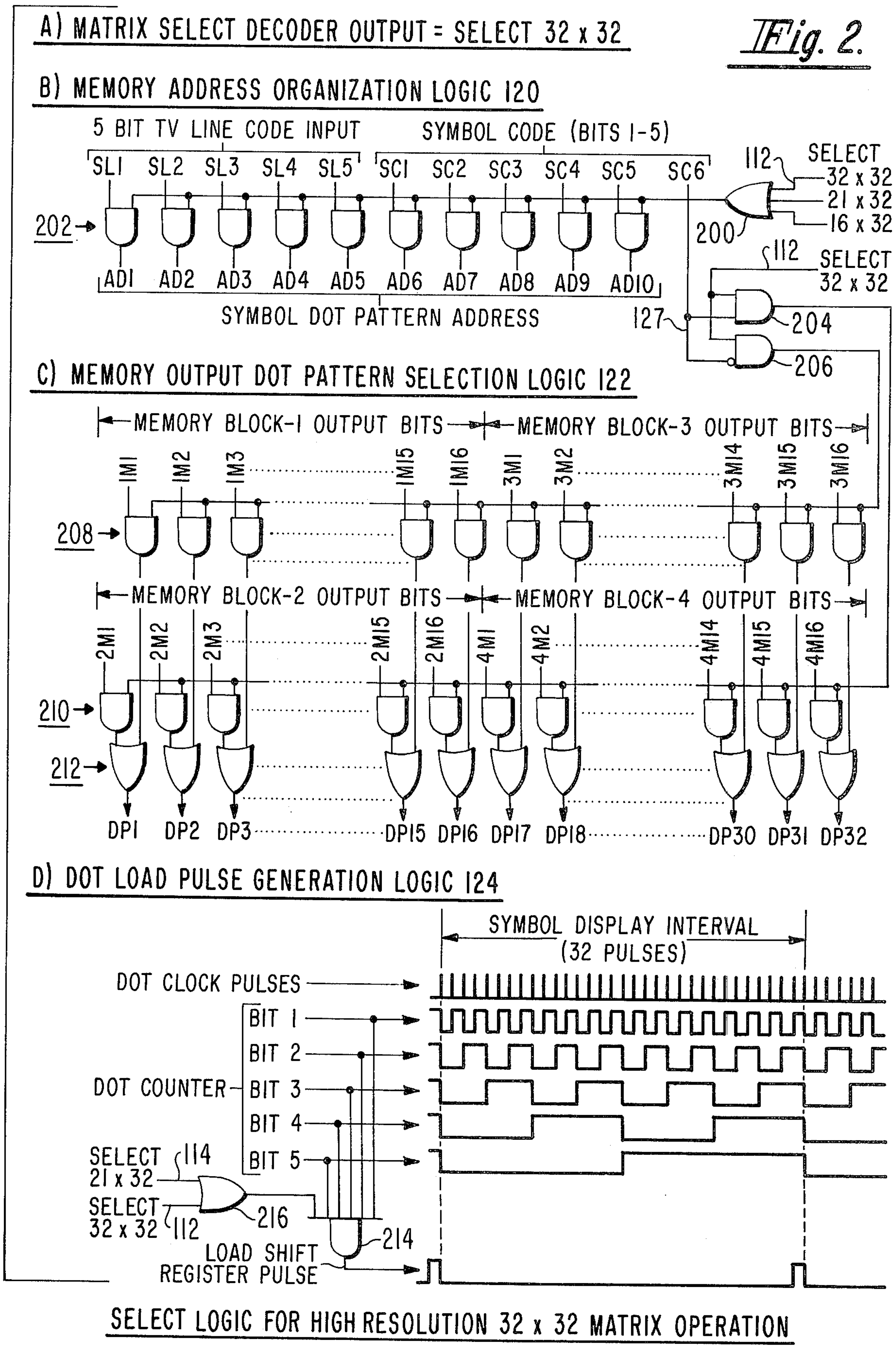
FIG. 2 illustrates the select logic for 32×32 matrix operation of the system of FIG. 1.

In particular, as shown in FIG. 2, when the matrix select decoder output indicates that the 32×32 matrix organization has been selected, the select 32×32 signal present on conductor 112 is applied through OR gate 200 as an enabling input to each of a group 202 of ten individual AND gates. The first five of the AND gates in group 202, respectively, receive the five-bit television line code input signals SL1 to SL5 as signals inputs thereto, while the last five of the group 202 of AND gates have the symbol code signals SC1 to SC5, respectively, applied thereto as signal inputs. The output from the group 202 of AND gates constitute the AD1 to AD10 symbol dot pattern address output from memory address organization logic 120.

At the same time, the SC6 signal is forwarded from memory address organization logic 120 over connection 127 and applied as a signal input to AND gate 204 and NAND gate 206 of memory output dot pattern selection logic 122. The 32×32 select signal on conductor 112 is applied as an enabling input to both AND gate 204 and NAND gate 206.

The output bits 1M1 to 1M16 from block 1 of character generator memory 100 and the output bits 3M1 to 3M16 from memory block 3 of character generator memory 100 are applied as signal inputs to group 208 of 32 AND gates. The output from NAND gate 206 is applied as an enabling input to each of the 32 AND gates of group 208. Output bits 2M1 to 2M16 from memory block 2 of character generator memory 100 and output bits 4M1 to 4M16 from memory block 4 of character generator memory 100 are applied as signal inputs to group 210 of 32 AND gates. The output from AND gate 204 is applied as an enabling input to each of the 32 AND gates of group 210. Each of group 212 of 32 OR gates has respective inputs applied thereto from the outputs of corresponding AND gates from groups 208 and 210. More specifically, the respective outputs from the 16 AND gates of group 208 associated with memory block 1 and the respective outputs of the 16 AND gates of group 210 associated with block 2 are applied as inputs to the corresponding first 16 of the group of 32 OR gates 212, while the respective outputs of the 16 AND gates of group 208 associated with memory block 3 and the respective outputs of the 16 AND gates of group 210 associated with memory block 4 are applied as inputs to the corresponding last 16 of the 32 OR gates of group 212. Respective outputs from the 32 OR gates of group 212 constitute signals DP1 to DP32 (which are loaded into shift register 105).

As is further shown in FIG. 2, dot load pulse generation logic 124 comprises a six-input AND gate 214, which receives an enabling input from OR gate 216 whenever either a select 32×32 signal is present on conductor 112 or a select 21×32 signal is present on conductor 112 or a select 21×32 signal is present on conductor 114. In addition, six-input AND gate 216 receives the respective five bits of a five bit dot counter input applied to dot load pulse logic 124 from timing and control logic 126 (as shown in FIG. 1). As indicated in the D portion of FIG. 2, each symbol display interval, consisting of 32 consecutive dot clock periods, is equal to sixteen square-wave bit-1 periods; eight square-wave bit-2 periods; four squarewave bit-3 periods; two square-wave bit-4 periods, and one square-wave bit-5 period. All five of these square-wave bit-1, bit-2, bit-3, bit-4 and bit-5 periods are phased to have a negative-going edge in coincidence with the beginning of each successive symbol display interval. Therefore, all five simultaneously exhibit a positive level only during the last (the 32nd) dot clock period of each successive symbol display interval. Thus, six-input AND gate 214 produces an output signal, which constitutes a load shift register pulse, only during this last clock period of each successive symbol display interval, as shown in the D portion of FIG. 2. Shift register 105 is loaded with signals DP1 to Dp32 only during the occurrence of each load shift register pulse and a clock pulse leading edge.

In the 32×32 matrix mode, the address organization logic shown in the B portion of FIG. 2 produces a 10-bit memory address word, which is composed of a five-bit symbol code (bits 1–5) specifying one of 32 symbol dot matrices located in each of the 1024×16 bit memory blocks 1 to 4, where each dot matrix location stores 32 (16 bit) dot pattern words, and a five-bit television scan line code (bits 6–10) specifying a single one of the 32 (16 bit) dot pattern words within the symbol dot matrix location selected by the five-bit symbol code.

The memory output dot pattern select logic shown in the C portion of FIG. 2 selects 32 bit dot pattern codes for 64 symbols from either memory blocks 1 and 3 or, in the alternative, memory blocks 2 and 4, depending upon the state of symbol code bit 6 (SC6). In particular, if symbol code bit 6 (SC6) manifests a binary zero, the 32 bit dot pattern codes for 32 symbol matrices stored in memory block 1 and 3 are selected because NAND gate 206 is then open and, the 32 AND gates of group 208 are then enabled. When symbol code bit 6 (SC6) manifests a binary one, the 32 bit dot pattern codes for 32 symbol matrices stored in memory blocks 2 and 4 are selected, because AND gate 204 is then open and the 32 AND gates of group 210 are then enabled.

Figure 3:
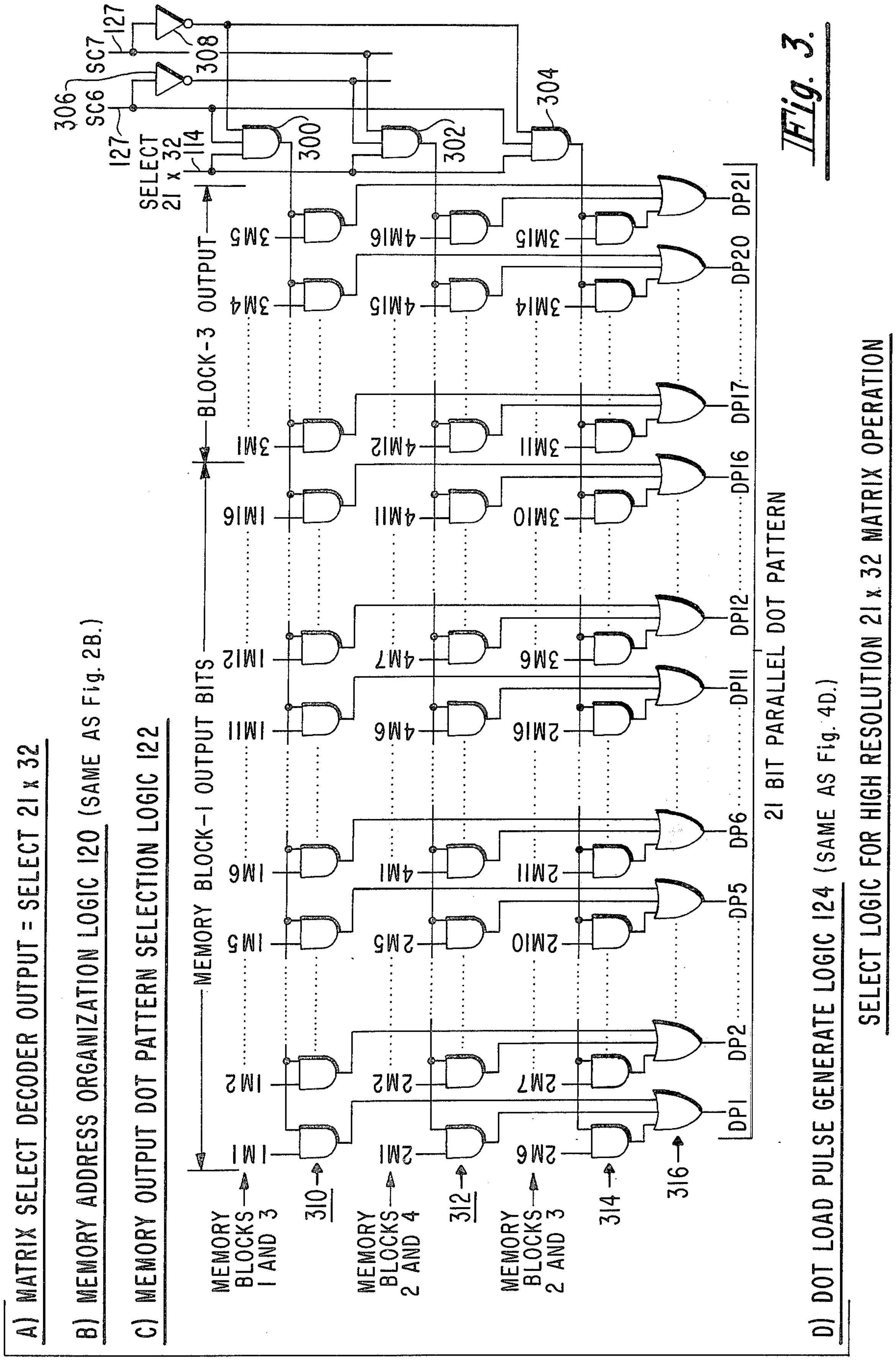
FIG. 3 illustrates the select logic for 21×32 matrix operation of the system of FIG. 1.

The dot load pulse generation logic shown in the D portion of FIG. 3 results in the sending of a load pulse to shift register 105 for every 32 clock pulses, with this load pulse occurring at the start of each symbol display interval across the television screen.

Referring now to FIG. 3, which is concerned with the select logic for 21×32 matrix operation, it will be noted that memory address organization logic 120 and dot load pulse generation logic 124 are identical to that shown in FIG. 2. However, a different portion of memory output dot pattern selection logic 122 is employed for 21×32 matrix operation than is employed for 32×32 operation.

In particular, the presence of a select 21×32 signal on conductor 114 enables respective three-input AND gates 300, 302 and 304. The SC6 signal present on a conductor of connection 127 is forwarded directly as an input to AND gate 300 and 304 and through inverter 306 as an input to AND gate 302. Similarly, the SC7 signal present on another conductor of connection 127 is applied directly as an input to AND gate 302 and through inverter 308 as in input to AND gates 300 and 304.

A first group 310 of 21 AND gates is enabled in response to an output from AND gate 300; a second group 312 of 21 AND gates is enabled in response to an output from AND gate 302, and a third group 314 of 21 AND gates is enabled in response to an output from AND gate 304. As shown in FIG. 3, the 21 AND gates of group 310 receives signal inputs from the entire 16 bit word, 1M1 to 1M16, from memory block 1 of character generator memory 100 and, in addition, receives the first five bits, 3M1 to 3M5, of the 16 bit words from blocks 3 of character generator memory 100. Similarly, bits 2M1 to 2M5 and 4M1 to 4M16 are applied as shown in FIG. 3 as signal inputs to the 21 AND gates of group 312 and bits 2M6 to 2M16 and 3M6 to 3M15 are applied as shown in FIG. 3 as signal inputs to the 21 AND gates of group 314.

Group 316 of 21 three-input OR gates receive inputs of corresponding AND gates of group 310, 312 and 314 in the manner shown in FIG. 3 to provide a 21 bit parallel dot pattern which is loaded into an appropriate set of 21 stages of the 32 bit shift register 105.

In the 21×32 matrix mode, the memory output dot pattern selection logic shown in the C portion of FIG. 3 selects 21 bit dot pattern codes for 96 symbols from different memory block combinations depending upon the logic state of symbol code bits 6 and 7 (SC6, SC7). In particular, when symbol code 6 (SC6) manifests a binary one and bit 7 (SC7) manifests a binary zero, a 21 -bit dot pattern code is selected from a group of 32 symbol matrices stored in memory block 1 (bits 1 to 16) and memory block 3 (bits 1 to 5). When symbol code bit 6 (SC6) manifests a binary zero and bit 7 (SC7) manifests a binary one, a 21 bit dot pattern code for a group of 32 symbol matrices stored in memory block 2 (bits one to five) and memory block 4 (bits one to sixteen) is selected. When symbol code bit 6 (SC6) manifests a binary one and bit 7 (SC7) also manifests a binary one, a 21 bit dot pattern code for a group of 32 symbol matrices stored in memory block 2 (bit 6 to 16) and memory block 3 (bit 6 to 15) is selected.

In the case of the 21×32 matrix mode operation shown in FIG. 3, the occurrence of a load shift register pulse from dot load pulse logic 124 causes the 21 bit dot pattern word plus eleven blanks to be loaded into 32 bit shift register 105. The eleven blank dots appear on the display as the horizontal space between adjacent displayed symbols.

Figure 4:
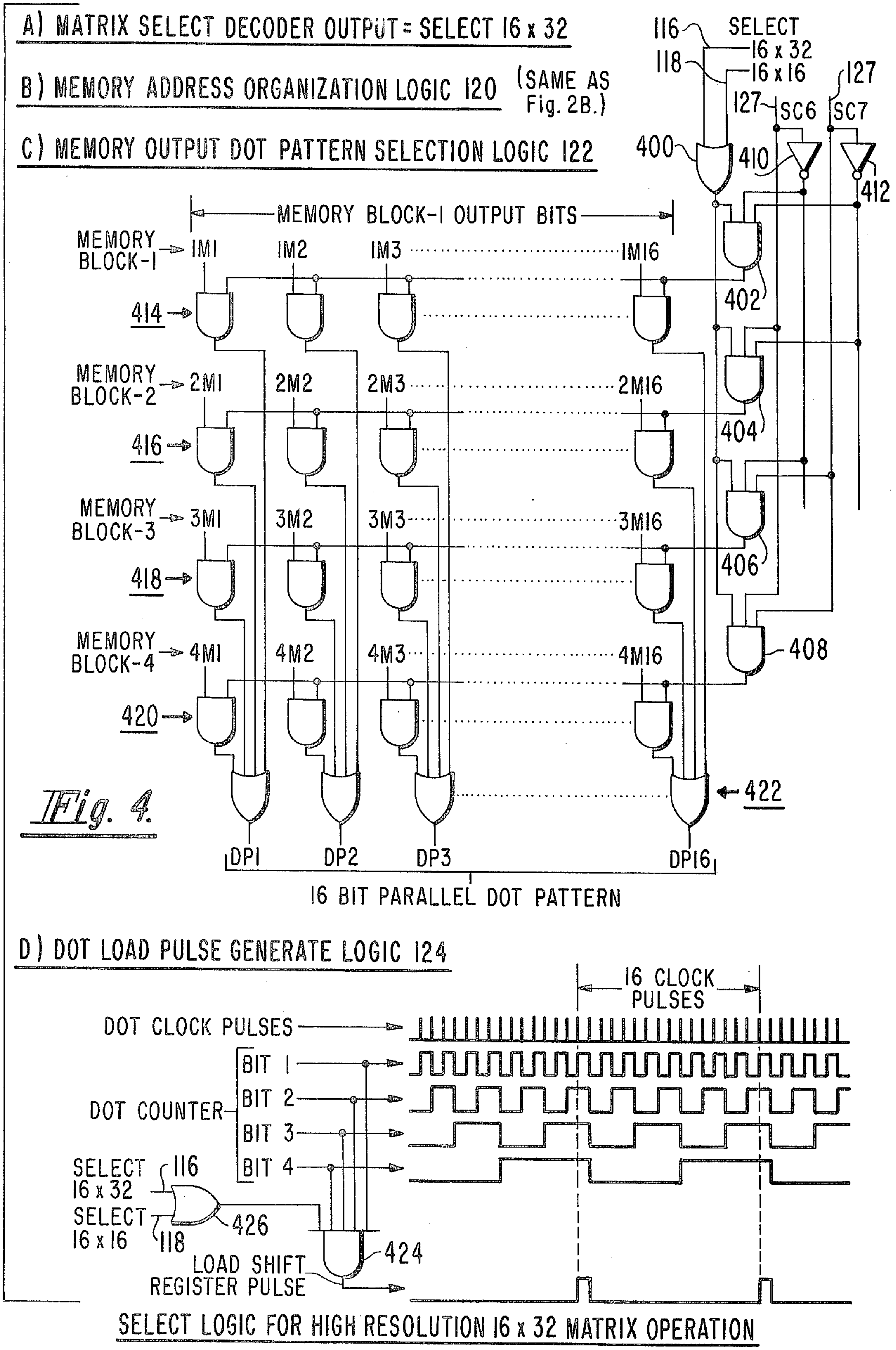
FIG. 4 illustrates the select logic for 16×32 matrix operation of the system of FIG. 1.

Referring now to FIG. 4, memory address organization logic 120 is the same for 16×32 matrix operation as for 32×32 matrix operation, but the portion of memory output dot pattern selection logic 122 and dot load pulse generate logic 124 employed for 16×32 matrix operation is somewhat different.

In particular, a select 16×32 signal on conductor 116 or a select 16×16 signal on conductor 118 results in a first enabling input being applied through OR gate 400 to each of 3-input AND gates 402, 404, 406 and 408. The SC signal present on a conductor of connection 127 is applied directly as a second input to AND gate 404 and 408 through inverter 410 as a second input to AND gates 402 and 406. The SC7 present on another conductor of connection 127 is applied directly as a third input to AND gates 406 and 408 and through inverter 412 as a third input to AND gates 402 and 404.

A first group 414 of 16 AND gates is enabled in response to an output from AND gate 402; a second group 416 of 16 AND gates is enabled in response to an output from AND gate 404; a third group 418 of 16 AND gates is enabled in response to an output from AND gate 406, and a fourth group 420 of 16 AND gates is enabled in response to an output from AND gate 408. The 16 AND gates of group 414 receive as signal inputs the 16 output bits, 1M1 to 1M16 from memory block 1; the 16 AND gates of group 416 receive the 16 output bits, 2M1 to 2M16 from memory block 2; the 16 AND gates of group 418 receive as signal inputs the 16 output bits, 3M1 to 3M16 from memory block 3, and each of the 16 AND gates of group 420 receive signal inputs the 16 output bits, 4M1 to 4M16, from memory block 4. Each of a group 422 of 16 four-input OR gates receive its four inputs from the respective outputs of corresponding ones of AND gate groups 414, 416, 418 and 420, as shown in FIG. 4. The outputs DP1 to DP16 from the 16 OR gates of group 422 constitute a 16 bit parallel dot pattern.

As shown in the D portion of FIG. 4, dot load pulse generate logic 124 for 16×32 matrix operation includes a five-input AND gate 424 which receives an enabling input in response to either a select 16×32 signal present on conductor 116 or select 16×16 signal present on conductor 118 being passed through OR gate 426. Dot counter bits 1, 2, 3 and 4 (which correspond to the first four of the five dot counter bits shown in the D portion of FIG. 2) are applied as signal inputs to five-bit AND gate 424. As shown, an output pulse having a duration equal to a dot period will appear at the output of five-input AND gate 424 at the beginning of each consecutive time interval having a duration of 16 dot clock pulses.

In the 16×32 matrix mode, the memory output dot pattern selection logic shown in the C portion of FIG. 4 selects a 16 bit dot pattern code for 128 symbols, with 32 different symbols being obtained from each different one of the four memory blocks. The selected block depends upon the logic state of symbol code bit 6 (SC6) and 7 (SC7). In particular, when symbol code bit 6 (SC6) manifests a binary zero and bit 7 (SC7) manifests a binary zero, the selected 16 bit dot pattern code manifests one of the 32 symbol matrices stored in memory block 1 of character generator 100. When symbol code bit 6 (SC6) manifests a binary one and bit 7 (SC7) manifests a binary zero, a 16 bit dot pattern code is selected for one of the 32 symbol matrices stored in memory block 2 of character generator memory 100. When symbol code bit 6 (SC6) manifests a binary zero and bit 7 (SC7) manifests a binary one, a 16 bit dot pattern code is selected for one of the 32 symbol matrices stored in memory block 3 of character generator memory 100. When symbol code bit 6 (SC6) manifests a binary one and bit 7 (SC7) manifests a binary one, a 16 bit dot pattern code is selected for one of the 32 symbol matrices stored in memory block 4 of character generator 100.

Figure 5:
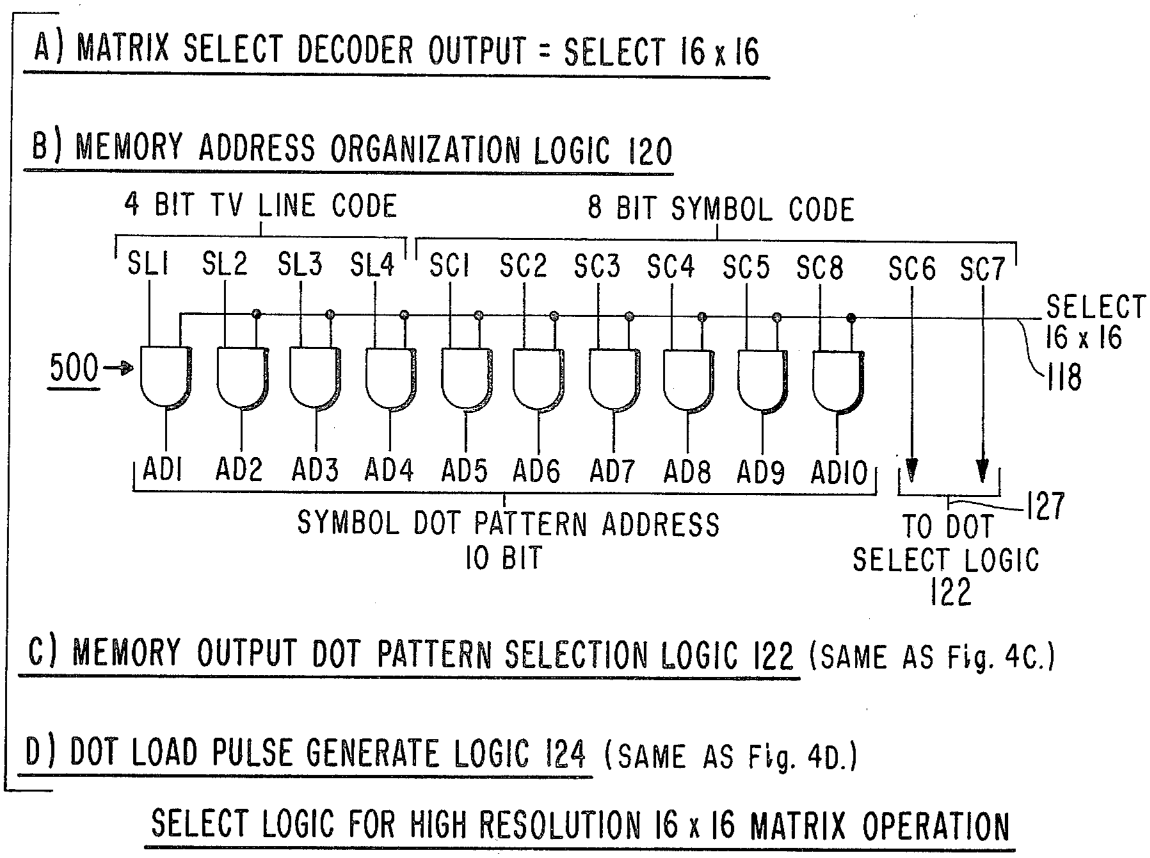
FIG. 5 illustrates the select logic for 16×16 matrix operation of the system of FIG. 1.

The dot load pulse generator logic comprising the AND gate function shown in the D portion of FIG. 5 send a load pulse to the two-bit shift register 105, for each interval of 16 consecutive clock pulses. This load pulse occurs at the start of each symbol display interval across the television screen.

Referring now to FIG. 5, it will be seen that in the select logic for 16×16 matrix operation, the arrangement of both memory output dot pattern selection logic 122 and dot load pulse generate logic 124 is identical to that shown for 16×32 matrix operation in FIG. 4. However, the arrangement of memory address organization logic 120 is different in the select 16×16 mode than it is in the select 16×32 mode.

In particular, as shown in FIG. 5, memory address organization logic 120 comprises a group 500 of 10 AND gates which are enabled by the select 16×16 signal present on conductor 118. The first four AND gates in group 500 receive as respective signal inputs the signals SL1 to SL4 of a four-bit television line code. (Signal SL1 to SL4 are identical to the first four of the five-bit television line code SL1 to SL5 employed in the arrangement of memory address organization logic 120 shown in the D portion of FIG. 2.) It is further shown in FIG. 5, the first five bits, SC1 to SC5 of an eight-bit symbol code are respectively applied as signal inputs to the next five AND gates of group 500. The six (SC6) and seven (SC7) bits of the eight bit symbol code are directly forwarded to dot select logic 122 over connection 127. The eighth bit (SC8) of this eight bit symbol code is applied as a signal input to the tenth AND gate of the group 500 of ten AND gates, as shown. The output AD1 to AD10 from the ten AND gates of group 500 constitute the ten bit symbol dot pattern address applied to character generator memory 100. In the 16×16 matrix mode, the ten bit symbol dot pattern address, AD1 to AD10 is composed of a six bit symbol code, AD5 to AD10, specifying one of 64 symbol dot matrices located in each of the four memory blocks, where each dot matrix location stores 16 (16 bit) dot pattern words. The remaining four bits, AD1 to AD4, specify one of the 16 (16 bit) dot pattern words within a symbol dot matrix location.

Because the memory output dot pattern selection logic 122 shown in the C portion of FIG. 4 and the dot load pulse generation logic 124 shown in the D portion of FIG. 4 is enabled by the presence of a 16×16 signal on conductor 118, in the same manner as by the presence of a select 16×32 signal on conductor 116, the operation of memory output dot pattern selection logic 122 and dot load pulse logic 124 in the 16×16 matrix mode is identical to that discussed above for the 16×32 mode. The concepts employed in the high resolution variable matrix generator system disclosed in FIGS. 1 to 5, can be applied with some simplification to a low resolution variable matrix character generator system of the type shown in FIGS. 6 and 7.

Figure 6:
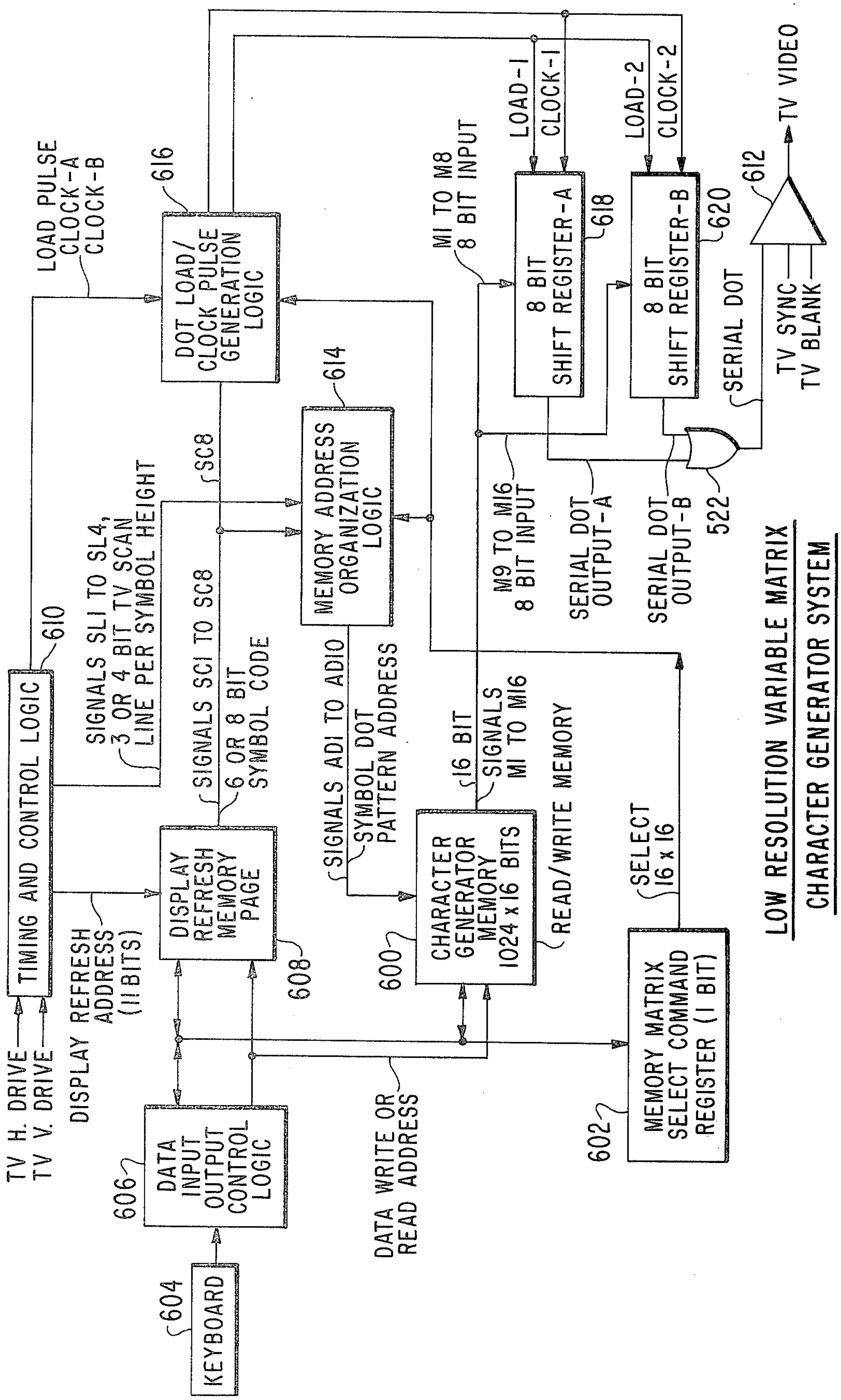
FIG. 6 is a block diagram of a low resolution variable matrix character generator system.

In particular, in the low resolution variable matrix character generator system of FIG. 6, a single block of 1024×16 bits read/write memory can be employed as the entire character generator memory 600 (rather than requiring four such blocks as does character generator memory 100 of the high resolution variable matrix character generator system). Since memory matrix select command register 602 employed in the low resolution variable matrix character generator system of FIG. 6, stored only a single bit (rather than two bits as in the high resolution variable matrix character generator system of FIG. 1), there is no need to include a matrix select command decoder (such as matrix select command decoder 104) in the low resolution variable matrix character generator system of FIG. 6.

However, elements such as keyboard 604, data input-/output control logic 606, display refresh memory page 608, timing and control logic 610 and signal mixer 612 are similar in all respects (except as discussed below) to the corresponding elements 108, 106, 110, 126 and 128 of FIG. 1. Functions similar to the functions performed by blocks 120, 122 and 124 (described in detail above) of FIG. 1 are performed in the low resolution variable matrix character generator system of FIG. 6 by memory address organization logic 614 and dot load/-clock pulse generation logic 616 in a manner to be described in more detail below. Further, in the low resolution variable matrix character generator system of FIG. 6, eight bit shift register-A 618 and eight-bit shift register-B 620 replace the single 32 bit shift register 105 of FIG. 1. The respective outputs from shift register 618 and 620 are combined in OR gate 622 to provide the serial dot video input to signal mixer 612.

Figure 7:
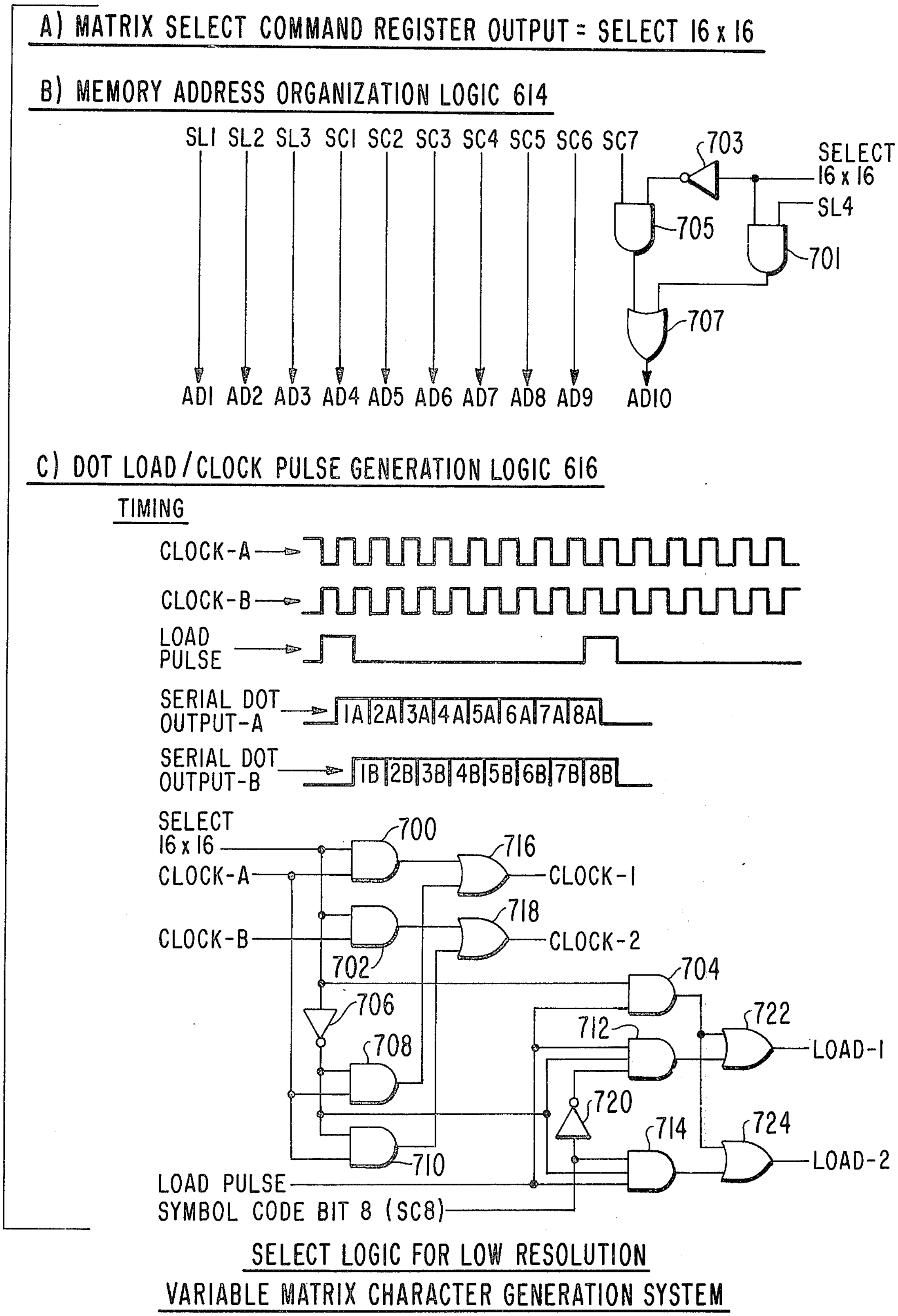
FIG. 7 illustrates the select logic for the operation of the system of FIG. 6.

In order to understand the operation of the low resolution variable matrix character generator system of FIG. 6, it is necessary to discuss the detailed arrangement of memory address organization logic 614, shown in the B portion of FIG. 7, and the detailed arrangement of dot load/clock pulse generation logic 616, shown in the C portion of FIG. 7.

More specifically, as shown in FIGS. 6 and 7, the SL1 to SL3 (the first three of the four television scan line per symbol height signals from timing and control logic 610) and the SC1 to SC6 bits ( the first six of the eight signals of the symbol code from display refresh memory page 608) are forwarded directly to respective ones of AD1 to AD9 outputs (the first nine of the ten bit signals forming this symbol dot pattern address to character generator memory 600). The binary bits present on the select 16×16 output from memory matrix select command register 602 is applied directly as an enabling input to AND gate 701 and through inverter 703 as an enabling input to AND gate 705. The SL4 bit (the fourth of the four television scan line per symbol height signals from timing control logic 610) is applied as a signal input to AND gate 701 and the SC7 bit (the seventh of the eight bit symbol code from display refresh memory page 608) is applied as a signal input to AND gate 705. The AD10 output from memory address organization logic 614 (which is applied to the tenth bit of the 10 bit symbol dot pattern address to character generator memory 600) is obtained by passing the respective outputs of AND gate 701, 705 through two-bit OR gate 707. Therefore, when the select 16×16 signal is present (manifesting the selection of a 16×16 dot matrix) the SL4 bit is forwarded as the AD10 output bit, while when the select 16×16 signal is absent (manifesting the selection of an 8×8 dot matrix) the SC7 is forwarded as the AD10 output.

As shown in detail in the C portion of FIG. 7, dot load/clock pulse generation logic 616 of FIG. 6 receives clock-A, clock-B and load pulse inputs from timing and control logic 210. Specifically, both clock-A clock-B are square waves having a frequency equal to the dot rate, with clock-B being inverted with respect to clock-A. That is, each negative half-cycle of clock-B occurs in time coincidence with a positive half-cycle of clock-A and each positive half-cycle of clock B occurs in time coincidence with a negative half-cycle of clock-A, as shown in FIG. 7. The load pulse is a series of positive pulses, each having a duration equal to a dot period and occurring in coincidence with the first of each successive sequence of eight consecutive cycles of clock-A (assuming each cycle of a clock begins at a positive-going leading edge) as shown in the C portion of FIG. 7.

Dot load/clock pulse generation logic 616 includes AND gates 700, 702 and 704, all of which have the select 16×16 output from memory matrix select command register 602 directly applied as an enabling input thereto. The select 16×16 output from matrix select command register 602 is also applied through inverter 706 as a disabling input to AND gates 708, 710, 712 and 714. Clock-A is applied as a signal input to AND gates 700, 708 and 710, while clock-B is applied as a signal input to only AND gate 702. The respective outputs of AND gate 700 and 708 are applied through OR gate 716 to provide clock-1 as an output signal therefrom. The respective outputs of AND gate 702 and 710 are applied through OR gate 718 to provide clock-2 as a signal output therefrom.

Symbol code bit 8 (SC8) is applied directly as an input to AND gate 714 to enable AND gate 714 only when symbol code bit 8 (SC8) manifests a binary one. Further, symbol code bit 8 (SC8) is applied through inverter 720 as an input to AND gate 712 to enable AND gate 712 only when symbol code bit 8 (SC8) manifests a binary zero. Each load pulse is applied as a signal input to both AND gate 712 and 714.

The outut of AND gate 704 is applied as a first input to both OR gate 722 and 724. The output from AND gate 712 is applied as a second input to OR gate 722 and the output from AND gate 714 is applied as a second input to OR gate 724. Load-1 constitutes the output from OR gate 722 and load-2 constitutes the output from OR gate 724.

In response to the presence of a select 16×16 (manifesting the selection of a 16×16 size matrix), the dot load/clock pulse generation logic 616 derives clock-A as its clock-1 output and derives clock-B as its clock-2 output. However, in response to the absence of a select 16×16 signal (manifesting the selection of an 8×8 matrix mode) both the clock-1 and clock-2 output signals correspond with the clock-A (so that clock-B is not used in this case). Since, the clock-1 output from OR gate 716 in all cases corresponds with the clock-A input, from the point of view of the logic involved, clock-A could merely be extended to clock-1 and AND gate 700 and 708 could be dispensed with. However, in order to provide equal delays, the derivation of clock-1 and clock-2 from the input clock, AND gate 700 and 708, as well as OR gate 716, should be provided.

Further, when a select 16×16 signal is present, AND gate 704 is enabled, both a load-1 input signal from OR gate 722 and a load-2 output signal from OR gate 724 simultaneously occur during the occurrence of each applied load pulse. However, in response to the absence of a select 16×16 signal, depending upon the binary value of the applied symbol code bit 8 (SC8) signal, either a load-1 output from OR gate 722 or a load-2 output from OR gate 724, but not both, is obtained.

As shown in FIG. 6, the load-1 and clock-1 outputs from dot load/clock pulse generation logic 616 are applied as inputs to shift register-A 618 and the load-2 and clock-2 outputs from dot-load/clock pulse generation logic 616 are applied as inputs to shift register-B 620. As further indicated in FIG. 6, shift register-A 618, in response to a load-1 signal input and positive edge of clock-1 pulse therto, loads the 8 respective stages thereof with the first eight bits M1 to M8, of the 16 bit signal output from character generator memory 600, while shift register-B 620, in response to a load-2 signal input and positive edge of clock-2 pulse thereto loads the stages thereof with the last eight bits M9 to M16 of the sixteen bit output of character generator memory 600. In the absence of the load-1 and load-2 pulses the clock-1 pulses operate as shift pulses on their positive-going edges for shift register-A 618 and the clock-2 pulses operate as shift pulses on their positive-going edges for shift register-B 620.

In considering the operation of the low resolution character generator shown in FIGS. 6 and 7, when the select 16×16 signal is present (manifesting the selection of a 16×16 matrix), the ten signals AD1 to AD10, output from memory address organization logic 614, which form the symbol dot pattern address to character generator memory 600, includes a 6-bit symbol code, SC1 to SC6, employed to select 64 symbol matrix locations of 16×16 bits per location and a 4-bit television scan line per symbol height code, SL1 to SL4 to select one of the 16 rows within the selected 16×16 dot matrix.

Further, with a select 16×16 signal present, the shift pulses of clock-1 correspond with clock-A, while the shift pulses of clock-2 correspond with clock-B. Therefore, as shown in the C portion of FIG. 7, the serial dot output-A from shift register-A 618 and the serial dot output-B of shift register-B 620 occurs in staggered relationship, so that the first of the eight bits in shift register-A 618 is read out, followed by the first of the eight bit shift register-B 620, followed by the second of the eight bits of shift register-A, followed by the second of the eight bit shift register-B, and so forth, until all eight bits of shift registers 618 and 620 have been read out. The serial dot output-A is applied as a first input to OR gate 622 and the serial dot output-D is applied as a second input to OR gate 622, to thereby derive a 16 bit serial dot output from OR gate 622 which is applied as a signal input to signal mixer 612.

In the absence of a select 16×16 signal, (manifesting the selection of an 8×8 matrix), the ten bit, AD1 to AD10 output from memory address organization logic 614, which is applied as a symbol dot pattern address character generator memory 600, includes bits SC1 to SC7 as a seven bit symbol code, which is employed by character generator memory 600 for specifying one of 128 symbol dot matrix locations, where each symbol dot matrix location stores eight (eight bit) dot pattern words. The ten bit, AD1 to AD10, output from memory address organization logic 614 also includes bits SL1 to SL3, which are employed by character generator memory 600 for specifying one of the 8 (8-bit) dot pattern words within a particular symbol dot pattern location.

As described above, in the 8×8 matrix mode of operation (where a select 16×16 signal is absent), only a selected one (in accordance with the binary value of symbol code bit SC8) of shift register 618 and 620 is loaded with eight bits. Further, both clock-1 and clock-2 correspond with clock-A. Therefore, in this case, the serial dot output from OR gate 622, which is applied as a signal input to mixer 612, comprises 8-bit sequences corresponding to either serial dot output-A or serial dot output-B (depending upon which of shift register 618 and 620 has been selected), with the serial dot output always taking place in coincidence with clock-A.

Under all conditions, the timing, as provided by timing control logic 610, assures that the serial dot output from OR gate 622 takes place during the occurrence of the appropriate symbol display interval on the television screen. That is, in the 16×16 matrix mode, the entire 16-bit serial dot pattern occurs during a horizontally symbol display interval on the television screen and, similarly, in the 8×8 matrix mode of operation, the 8 bit serial dot pattern also occurs during a horizontal symbol display interval on the television screen.

What is claimed is:

1. In a character generator system for digitally generating symbols for display on a display device exhibiting a television raster scan, said system comprising: a character generator memory having a predetermined fixed overall bit storage capacity for storing each respective one of a plurality of different symbols in two-dimensional dot-matrix form at a separate address location thereof, the dot matrix at all address locations having the same size first-dimension and the same size second-dimension; multibit shift register means having a number of stages at least equal to the size of said first dimension; timing and control logic synchronized with said television raster scan; first means, controlled by said timing and control logic and including a refresh memory page of stored multibit symbol codes defining the message to be displayed, for addressing said character generator memory during any scan line at the beginning of every successive symbol display interval with a multibit symbol dot pattern address word, said symbol dot pattern address word including a symbol code portion defining the character-generatormemory location of the symbol to be displayed in that symbol display interval and a scan-line code portion defining the ordinal position corresponding to the scan line then in progress in the dot matrix second dimension, whereby said character generator memory produces a parallel multibit dot pattern word output at least equal in size to the first dimension size of said dot matrix, at least a portion of said dot pattern word defining the portion of said symbol to be displayed in that symbol display interval which occurs during the scan-line then in progress; and second means controlled by said timing and control logic for loading stages of said shift register means with at least said portion of said parallel multibit dot pattern word output and then shifting said loaded word output from said shift register means with dot clock pulses during that symbol display interval; the improvement wherein:

a. said character generator memory is a read/write memory which may be programmed to store symbols in any selected single one of a given number of different predetermined dot-matrix sizes, with the number of different symbols and corresponding address locations therefor which can be accommodated being relatively larger for relatively small dot-matrix sizes than for relatively large dot-matrix sizes, and said system includes a dot-matrix register for registering therein the dot-matrix size that has been selected;

b. wherein said first means includes memory address organization logic coupled to said register and responsive to the registration therein for selecting the number of bits of the multibit symbol code from said refresh memory page assigned to the symbol code portion of said symbol dot pattern address word and for selecting the number of bits in said scan-line code portion of said dot pattern address word in accordance with the size of said second dimension of said dot matrix; and c. said second means includes dot pattern selection, load and clock logic coupled to said display refresh memory page and said register and responsive to the registration therein and the binary value of at least one predetermined bit of said multibit symbol code for selectively loading the stages of said shift register means with said bits of said parallel multibit dot pattern word output and shifting said shift register means to provide a serial sequence of the total number of dots in the first dimension of said selected size of dot matrix during each successive symbol display interval.

2. The system defined in claim 1, wherein the total number of bits in said multibit symbol dot pattern address word is the same for all of said given number of different predetermined dot-matrix sizes, whereby the sum of the selected number of bits assigned to the symbol code portion and the selected number of bits in the scan-line portion of said symbol dot pattern address word is a constant which is independent of the registration in said dot-matrix register.

3. The system defined in claim 2, a. wherein said character generator memory comprises four memory blocks each having a storage capacity of 1024 16-bit words and said symbol dot pattern address word is a ten-bit word which is simultaneously applied as an input to all of said four memory blocks, b. wherein said different predetermined dot-matrix sizes include a 32×32 size, a 21×32 size, a 16×32 size and a 16×16 size, c. wherein said memory organization logic assigns five of the ten bit symbol dot pattern address words to said symbol code portion thereof and the remaining five of the ten bits of said symbol dot pattern address word to said scan-line code portion thereof in response to any of said 32×32, 21×32 or 16×32 dot matrix sizes being selected by the registration in said dot-matrix register and assigns six of the ten bits of said symbol dot pattern address word to said symbol code portion thereof and the remaining four bits of the ten bits of said symbol dot pattern address word to said scan-line code portion thereof in response to said 16×16 dot matrix size being selected by the registration in said dot matrix register, d. wherein said shift register means is a shift register having at least thirty-two stages;

e. wherein said dot pattern selection, load and clock logic include memory output dot selection logic, which in response to: (1) selection of said 32×32 dot matrix loads thirty-two consecutive stages of said shift register with the respective 16-bit dot pattern word outputs from each of a given pair of said four memory blocks only when a first predetermined bit of said multibit symbol code manifests a given binary value, or with the 16-bit dot pattern word output from each of the remaining pair of said four memory blocks only when said first preselected bit manifests the complement of said given binary value, (2) selection of said 21×32 dot matrix loads twenty-one consecutive stages of said shift register with both the 16 bit dot pattern word output from a first of said four memory blocks and a first given five-bit portion of the 16 bit dot pattern word output from a second of said four memory blocks only when said first and second preselected bits of said multibit symbol code taken together manifest a first given binary value, or with both a first given five-bit portion of the 16 bit dot pattern word output from a third of said four memory blocks and the 16 bit dot pattern word from a fourth of said four memory blocks only when said first and second preselected bits taken together manifest a second given binary value different from said first given binary value, or with both a second given eleven-bit portion of the sixteen bit dot pattern word output from the second of said four memory blocks and a second given ten-bit portion of the 16 bit dot pattern word output from the third of said four memory blocks only when said first and second preselected bits taken together manifest a third given binary value different from both said first and second given binary values, and (3) selection of either said 16×32 or said 16×16 dot matrix loads sixteen consecutive stages of said shift register with the 16 bit dot pattern word output from a first of said four memory blocks only when first and second preselected bits of said multibit symbol code taken together manifest a first given binary value, or with the 16 bit dot pattern word output when said first and second preselected bits taken together manifest a second given binary value different from said first given binary value, or with the 16 bit dot pattern word output from a third of said four memory blocks only when said first and second preselected bits taken together manifest a third given binary value different from both said first and second given binary values, or with the 16 bit dot pattern word output from a fourth of said four memory blocks only when said first and second preselected bits taken together manifest a fourth given binary value different from each of said first, second and third given binary values, and f. wherein said dot pattern selection, load and clock logic also include dot load pulse logic for effecting a loading of said shift register at the beginning of each successive sequence of thirty-two consecutive dot clock shift pulses only when said 32×32, 21×32 or 16×32 dot matrix size is selected by the registration in said dot matrix register, and effecting a loading of said register at the beginning of each sequence of 16 consecutive dot clock shift pulses only when said 16×16 dot matrix size is selected by the registration in said dot matrix register.

4. The system defined in claim 1, a. wherein said shift register means includes first and second shift registers each having at least *n* stages, and an OR gate for combining the outputs of said first and second shift registers, b. wherein said dot matrix sizes includes a first dot matrix having a first dimension equal to *n* and a second dot matrix having a first dimension equal to 2*n*, c. wherein said dot pattern selection, load and clock logic includes coupling means responsive to a load pulse applied to said first shift register for loading said *n* stages of said first shift register with a first group of *n* bits of said dot pattern word output, said coupling means being responsive to a load pulse being applied to said second shift register for loading said *n* stages of said second shift register with a second group of $n$ bits of said dot pattern word output, and d. wherein said dot pattern selection, load and clock logic further includes dot load/clock pulse generation logic responsive to (1) selection of said first dot matrix for applying load pulses and a first series of dot clock shift pulses having a given dot period solely to said first shift register only when a preselected bit of said multibit symbol clock manifests a given binary value or for applying said load pulses and said first series of dot clock shift pulses solely to said second shift register only when said preselected bit manifests the complement of said given binary value, a load pulse occurring at the beginning of each successive sequence of n dot clock shift pulses of said first series, each load pulse having a duration substantially equal to said given dot period, and (2) selection of said second dot matrix for applying said load pulses and said first series of dot clock shift pulses to said first shift register and simultaneously therewith applying said load pulses and a second series of dot clock shift pulses to said second shift register, each pulse of said second series of dot clock shift pulses being delayed by substantially one-half said given dot period with respect to each pulse of said first series of dot clock shift pulses.

5. The system defined in claim 4, wherein the value of $n$ is eight, whereby the first dimension of said first dot matrix is eight and the first dimension of said first dimension of said second dot matrix is sixteen.

6. The system defined in claim 5, wherein the second dimension of said first dot matrix is eight and the second dimension of said second dot matrix is sixteen, wherein said memory organization logic in response to the selection of said first dot matrix derives a symbol code portion of said symbol dot pattern address word containing $m$ bits and derives a scan-line code portion of said symbol dot pattern address word containing three bits, and wherein said memory organization logic in response to the selection of said second dot matrix derives a symbol code portion of said symbol dot pattern address word containing (m-1) bits and derives a scan-line code portion of said symbol dot pattern address word containing four bits.

7. The system defined in claim 6, wherein the storage capacity of said character generator memory 1024 sixteen-bit words, and the value of $m$ is seven, whereby said character generator memory can store two-hundred fifty-six symbols in 8×8 dot matrix form or 64 symbols in 16×16 dot matrix form.

* * * * *

UNITED STATES PATENT OFFICE

CERTIFICATE OF CORRECTION

PATENT NO. : 3,928,845

DATED : 12/23/75

INVENTOR(S) : Robert John Clark

It is certified that error appears in the above-identified patent and that said Letters Patent are hereby corrected as shown below:

Column 11, line 3, change "therto" to --thereto--

Column 13, line 9, change "predetermined" to --preselected--

Column 13, lines 59&60, change "predetermined" to --preselected--

Column 14, line 27, after "output" insert --from a second of said four memory blocks only--

Signed and Sealed this

*twenty-seventh* Day of *April 1976*

[SEAL]

*Attest:*

RUTH C. MASON
*Attesting Officer*

C. MARSHALL DANN
*Commissioner of Patents and Trademarks*